H. D. CONE.
Shaft-Hanger.

No. 212,541.    Patented Feb. 25, 1879.

Witnesses:
J. N. Shumway
Fred C. Eddle

Henry D. Cone
Inventor
By Atty.

UNITED STATES PATENT OFFICE.

HENRY D. CONE, OF STOCKBRIDGE, MASSACHUSETTS.

IMPROVEMENT IN SHAFT-HANGERS.

Specification forming part of Letters Patent No. 212,541, dated February 25, 1879; application filed December 28, 1878.

*To all whom it may concern:*

Be it known that I, HENRY D. CONE, of Stockbridge, in the county of Berkshire and State of Massachusetts, have invented a new Improvement in Shaft-Hangers; and I do hereby declare the following, when taken in connection with the accompanying drawings and the letters of reference marked thereon, to be a full, clear, and exact description of the same, which said drawings constitute part of this specification, and represent, in—

Figure 1:
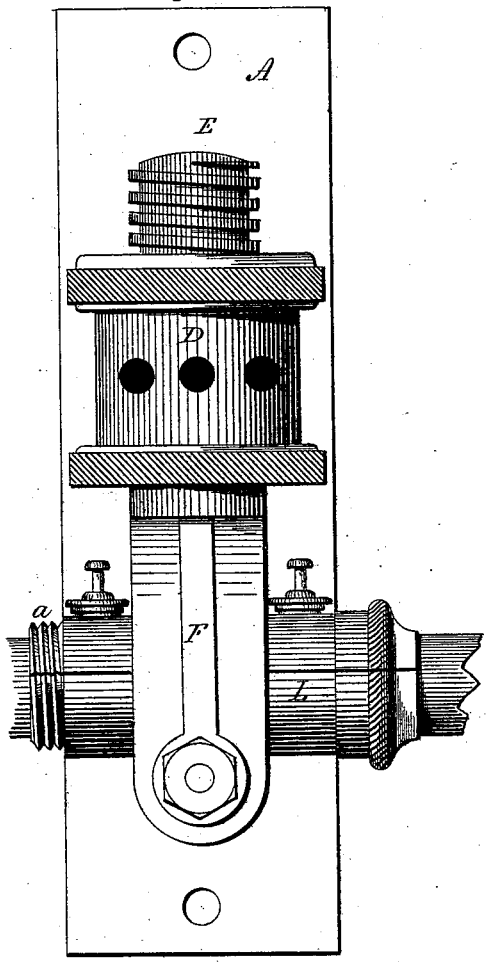
Figure 2:
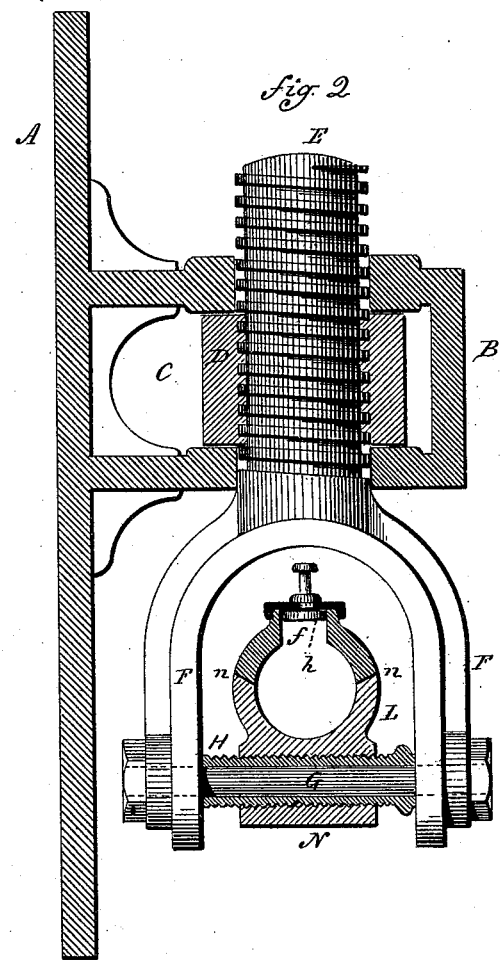
Figure 3:
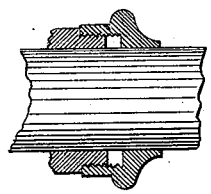
Figure 4:
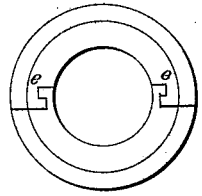

Figure 1, a front view; Fig. 2, a sectional side view; Figs. 3 and 4, detached views.

This invention relates to an improvement in that class of hangers or bearings used to support shafting employed in the driving or working of machinery, applicable alike to "overhead," "post," or "floor" supports, the object being to adjust the bearing after the hanger and shaft are in place, and so that the shaft may be removed and returned to place without the necessity of readjustment; and it consists in the construction hereinafter described, and more particularly recited in the claims.

As represented in Figs. 1 and 2, the invention is shown as applied to a post-hanger, and in these figures A is the plate by which the hanger is secured to the post. From this an arm, B, projects outward with a horizontal opening, C; or it may be a pair of arms, with a space between, or simply a single arm. In the open space C, or between the two arms, or on the top of the single arm, a nut, D, is arranged, with convenient provision for turning, here represented as perforations in the periphery of the nut. Through this nut a correspondingly-threaded shank, E, is introduced, and so that by turning the nut, which is stationary, in the direction of its axis the shank E will be raised or lowered, accordingly as the nut is turned to the right or left. Below the support of the nut the shank E is divided to form a pair of supporting-arms, F F. At the lower end of these arms, extending from one to the other, is a bolt, G, and on this bolt is a screw-threaded sleeve, H, arranged so as to be turned freely on the bolt, but so as to be prevented from longitudinal movement, here shown as extending from one arm to the other, the two arms forming stops to prevent such longitudinal movement.

L is the lower part of the box or bearing, and has upon its under side a transverse socket, N, screw-threaded to correspond to the sleeve H, and through which the sleeve H is introduced before being placed upon the bolt G, and so that by turning the said sleeve H the box supported thereon will be moved to one side of the opening between the arms F F, accordingly as the sleeve is turned to the right or left. Thus arranged, the box may be elevated or depressed by turning the nut D, or moved toward either arm F F to adjust the shaft, making such adjustment universal. The box, hanging upon the sleeve H, will oscillate thereon to adapt itself to the level-line of the shaft.

In arrangement for the floor, it will be understood that the preferable mode would be to invert the parts, making the shank below the shaft; but the adaptation of the adjusting device to either floor, ceiling, or other places will be understood from this description.

When it is desirable to remove the shaft, it is only necessary to take out the bolt G, and without disturbing the relative position of the sleeve H in the socket N. Then, when the shaft is replaced, the sleeve H will return to its previous position without any change in the position of the box, and consequently readjustment of the shaft is avoided.

The transverse adjustment made by the sleeve H may be used in a hanger without the vertical adjustment, or with other vertical adjustments than that described.

In boxes for shaft-hangers it is the usual plan to secure the cap to the other part of the box by bolts or screws, and in such arrangement the oil used for lubrication works out onto the shaft and drips therefrom, necessitating the hanging of drip-cups beneath the bearing. To avoid this difficulty I pack the ends of the boxes, by constructing the two parts with a screw-thread, *a*, at each end, and fit to this screw a packing box or collar, fitting over the shaft and turning onto the threaded ends of the box, with packing between, as seen in Fig. 3, thus making a close joint around the shaft and preventing all possibility of drip.

The meeting edges of the two boxes must be formed so that the joint between them will be tight, and this is best done by making a diagonal joint, as seen at n, Fig. 2; or a packing may be introduced, if preferred.

In order that the packing boxes or collar may be removed from or placed upon the shaft after the shaft is set, they are divided, as seen in Fig. 4, and a horizontal lock-joint, e, made on each side, diametrically opposite each other, and so that a longitudinal movement of one upon the other will engage or disengage the two parts, so that they may be held upon or removed from the shaft; but when the collar is screwed upon the end of the box such longitudinal movement of the two parts is prevented, and they are held together as one. This locking device may be variously constructed, it only being essential that they shall be connected together before being screwed onto the ends of the box, and that such screwing on shall prevent their separation.

As a means for lubricating the bearing, there is made upon the top of the cap one or more cavities, f, in which is set a weighted follower, h. The lubricating material is placed in the cavity f, and the follower holds it down, or forces it upon the shaft to supply consumption.

I claim—

1. In a shaft-hanger, the combination of the box which forms the bearing constructed with a transverse screw-threaded socket, a transverse correspondingly-threaded sleeve stationary in the direction of its axis, but so as to be rotated thereon, and a support for said sleeve, substantially as described.

2. In a shaft-hanger, the combination of the box which forms the bearing, constructed with a transverse screw-threaded socket, a transverse correspondingly-threaded sleeve stationary in the direction of its axis, but so as to be rotated thereon, a screw-threaded shank at right angles to and carrying said sleeve and box, with a correspondingly-threaded nut supported stationary in the direction of its axis, substantially as and for the purpose described.

3. In a bearing for shafting, the combination of the two parts of the box, threaded at the two ends, and a collar, correspondingly threaded, made in two parts, interlocking with each other by a longitudinal movement, and secured by the said screw-threads, substantially as described.

4. In a bearing for shafting, the cap or upper part of the box, constructed with one or more lubricating-cavities, combined with a follower, arranged in said cavity, and substantially as described.

HY. D. CONE.

Witnesses:
HENRY L. BREVOORT,
JOHN E. EARLE.